United States Patent
Son et al.

(10) Patent No.: US 7,596,191 B2
(45) Date of Patent: Sep. 29, 2009

(54) APPARATUS, METHOD AND COMPUTER PROGRAM PRODUCT PROVIDING A COMPUTATIONALLY EFFICIENT MAXIMUM LIKELIHOOD JOINT SYNCHRONIZATION AND CHANNEL ESTIMATION ALGORITHM

(75) Inventors: Jae H. Son, Irving, TX (US); Anthony Reid, Plano, TX (US)

(73) Assignee: Nokia Corporation, Espoo (FI)

( * ) Notice: Subject to any disclaimer, the term of this patent is extended or adjusted under 35 U.S.C. 154(b) by 627 days.

(21) Appl. No.: 11/298,278

(22) Filed: Dec. 8, 2005

(65) Prior Publication Data

US 2007/0133717 A1 Jun. 14, 2007

(51) Int. Cl.
*H04L 27/06* (2006.01)
(52) U.S. Cl. ...................................... 375/341
(58) Field of Classification Search ............... 375/262, 375/265, 341; 704/242; 714/792, 795; 370/207; 455/428
See application file for complete search history.

(56) References Cited

U.S. PATENT DOCUMENTS 5,159,608 A * 10/1992 Falconer et al. ............. 375/130
2005/0135498 A1* 6/2005 Yee ............................. 375/267
2005/0220231 A1* 10/2005 Bott et al. ................... 375/350

OTHER PUBLICATIONS

Yu et al. A Complexity-reduced joint detector for OFDM-CDM systems, IEEE, 2004, p. 2210-2214.*
Larsson, E.G. et al., "An Algorithm for Joint Symbol Timing and Channel Estimation for OFDM Systems", © 2001, IEEE, pp. 393-396.
Kim J.B. et al., "Iterative Joint Channel Estimation and Detection Combined with Pilot-Tome Symbols in Convolutionally Coded OFDM Systems", © 2003, IEEE, pp. 535-539.
Lim, W.C. et al., "Joint Channel Estimation and OFDM Synchronization in Multipath Fading", © 2004, IEEE, pp. 983-987.
Pun, M, et al., "Joint Synchronization and Channel Estimation in Uplink OFDMA Systems", © 2005, IEEE, pp. III-857-III-860.

* cited by examiner

*Primary Examiner*—Sam K Ahn
(74) *Attorney, Agent, or Firm*—Harrington & Smith, PC

(57) ABSTRACT

A method, computer program and apparatus operate so as to execute a two-dimensional (2-D) M survivor multi-resolution search algorithm and procedure for a signal received over a channel. The method includes, from one search stage to a next search stage, increasing parameter resolution while fixing a number of search operations at each search stage by a predetermined number of parameter survivors (M); and determining a Maximum Likelihood joint metric based on an accumulated value of survived search stages.

23 Claims, 10 Drawing Sheets

OVERVIEW OF 2-D M SURVIVOR MULTI-RESOLUTION SEARCH ALGORITHM (Ex. M=6)

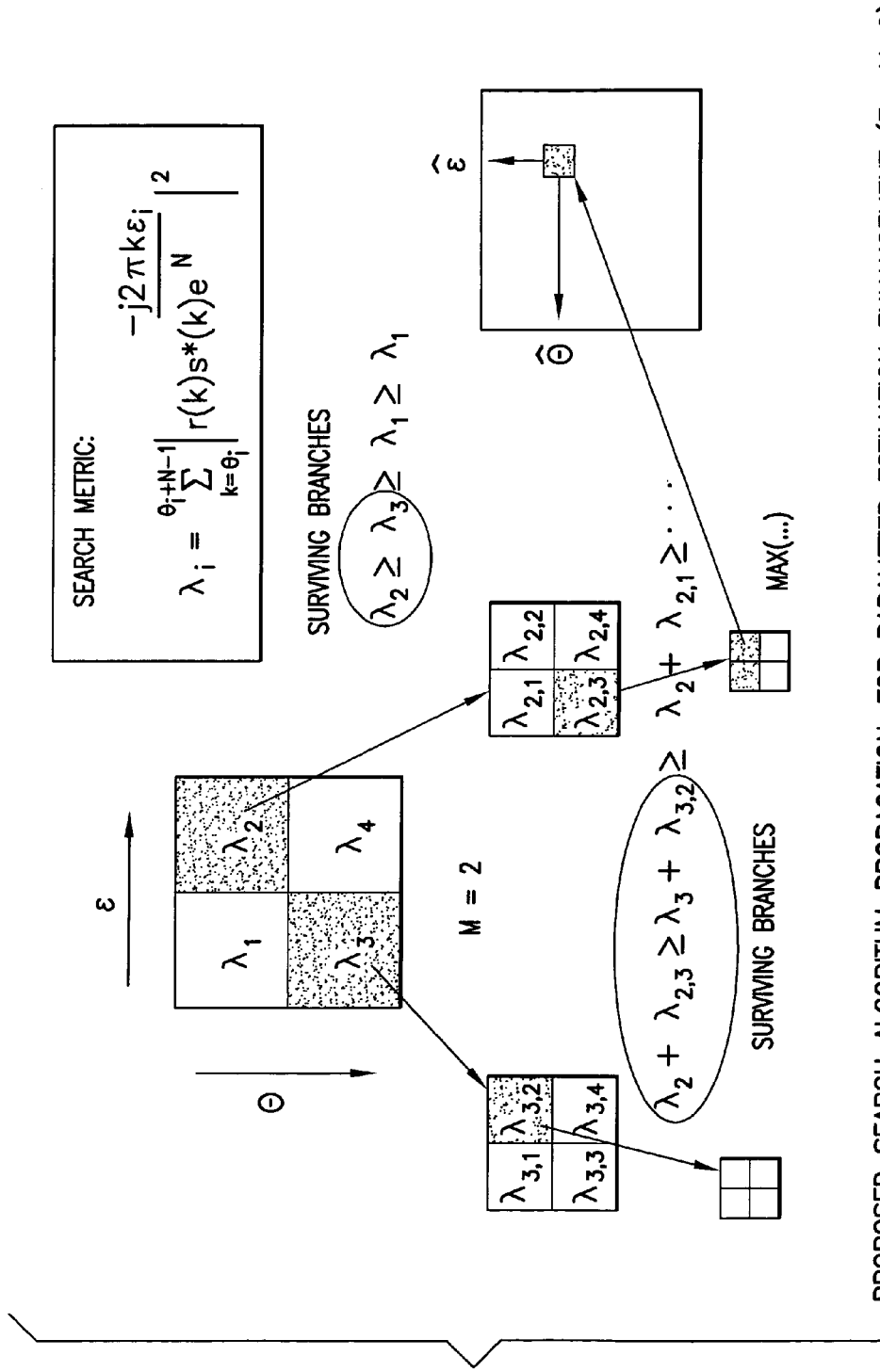

2-D CONTOUR SURFACE IMAGE OF PROPOSED SEARCH METRIC

ML JOINT ESTIMATOR OVERVIEW WITH M SURVIVOR SEARCH ALGORITHM

SIMULATION RESULTS OF FREQUENCY OFFSET ESTIMATION

APPARATUS, METHOD AND COMPUTER PROGRAM PRODUCT PROVIDING A COMPUTATIONALLY EFFICIENT MAXIMUM LIKELIHOOD JOINT SYNCHRONIZATION AND CHANNEL ESTIMATION ALGORITHM

TECHNICAL FIELD

The exemplary and non-limiting embodiments of this invention relate generally to data transmission and reception techniques and, more specifically, relate to a receiver having a signal recovery process that employs a predetermined data sequence for training the receiver to receive an incoming transmission.

BACKGROUND

The following abbreviations that appear in the ensuing description are defined as follows:

| ML | Maximum Likelihood |
|---|---|
| MAP | Maximum A Posteriori |
| OFDM | Orthogonal Frequency Division Multiplexing |
| CIR | Channel Impulse Response |
| CP | Cyclic Prefix |
| BER | Bit Error Rate |
| MSE | Mean Square Error |
| PGA | Programmable Gate Array |
| WLAN | Wireless Local Area Network |

A conventional channel estimation and synchronization approach performs each task sequentially based on a known preamble (training sequence) structure. For example, one known type of WLAN legacy preamble structure is designed such that initial frequency offset estimation is assumed to be operated on repetitive short preambles, while symbol timing estimation and channel estimation processes are expected to be based on a longer preamble.

There are other joint estimation approaches. One approach is to obtain joint symbol timing and channel estimation while assuming a carrier frequency offset being compensated (see Erik G. Larsson, Guoquing Liu, Jian Li, and Georgios B. Giannakis, "Joint Symbol Timing and Channel Estimation for OFDM Based WLANs", IEEE Communication Letters, Vol. 5, No. 8, August 2001). Its joint estimation is based on the minimization of a known frequency domain preamble sequence where Akaike information criterion is used to jointly estimate the exact time offset and a channel length. Another approach is based on alternating projection algorithm (which solves multi-dimensional problems through an iterative one dimensional approach) to find the frequency offset estimation and thus obtain the channel estimation for an uplink OFDM system (see Man-On Pun, Shang-Ho Tsai, and C.-C. Jay Kuo, "Joint Maximum Likelihood Estimation of Carrier Frequency Offset and Channel in Uplink OFDMA Systems", The IEEE 2004 Globecom PIMRC, Vol. 6, pp. 3748-3752 & Man-On Pun, C.-C. Jay Kuo and Michele Morelli, "Joint Synchronization and Channel Estimation in Uplink OFDMA Systems", ICASSP 2005, pp. 857-860, referred to below as Pun et al). However, this approach assumes time synchronization of each user, and thus does not offer a full synchronization solution (both frequency offset and symbol offset estimation) and channel estimation simultaneously.

Recently, a closed form solution of joint synchronization and channel estimation has been proposed based on ML theory, but no ML parameter search methodology was provided (Wei Chee Lim, B. Kannan and T. T. Tjhung, "Joint Channel Estimation and OFDM Synchronization in Multipath Fading", 2004 IEEE ICC Vol. 2, pp. 983-987, June 2004, referred to hereafter as Lim et al.).

In general, a conventional ML joint synchronization and channel estimation scheme faces computational complexity problems in regards to ML parameter search operations.

SUMMARY

In accordance with exemplary embodiments of this invention there is provided a method that is applied to a signal received over a channel, the method including executing a two-dimensional (2-D) M survivor multi-resolution search from one search stage to a next search stage by increasing parameter estimates resolution while fixing a number of search operations at each search stage by a predetermined number of parameter survivors; and determining either a full Maximum Likelihood joint metric or a computationally efficient sub-optimal Maximum Likelihood joint metric based on an accumulated value of channel estimation.

Further in accordance with exemplary embodiments of this invention a device is provided a unit that includes means for executing a 2-D M survivor multi-resolution search for a signal received over a channel. The search means includes means, operable from one search stage to a next search stage, for increasing parameter resolution and fixing a number of search operations at each search stage by a predetermined number of parameter survivors, and means for defining either a full Maximum Likelihood joint metric or a computationally efficient sub-optimal Maximum Likelihood joint metric based on an accumulated value of channel estimation.

Further still in accordance with exemplary embodiments of this invention there is provided a computer program, a method and an apparatus for implementing a joint frequency and time synchronization and channel estimation based on Maximum Likelihood parameter search function in conjunction with either a full Maximum Likelihood joint metric or a computationally efficient sub-optimal Maximum Likelihood joint metric for a received signal. This is accomplished in the exemplary embodiments of the invention by setting values of frequency offset and time offset parameter pairs to coarsely cover a search range; generating a contour surface of a search metric corresponding to the parameter pairs; among all parameter pairs, identifying surface regions corresponding to M surviving parameter pairs that yield M largest metrics; further splitting individual surface regions corresponding to the M survived parameter pairs into a plurality n of sub-regions; obtaining n*M search decision metrics by adding current search stage metrics to previous search stage metrics; and iterating from generating the contour surface until finished based on a desired parameter estimate resolution or other threshold method.

BRIEF DESCRIPTION OF THE DRAWINGS

In the attached Drawing Figures:

FIGS. 1a and 1b, collectively referred to as FIG. 1, depict the operation of a two-dimensional (2-D) M survivor multi-resolution search algorithm and procedure and depict in a simplified form the operation of the search algorithm when M=2, respectively;

DETAILED DESCRIPTION

Figure 1A:
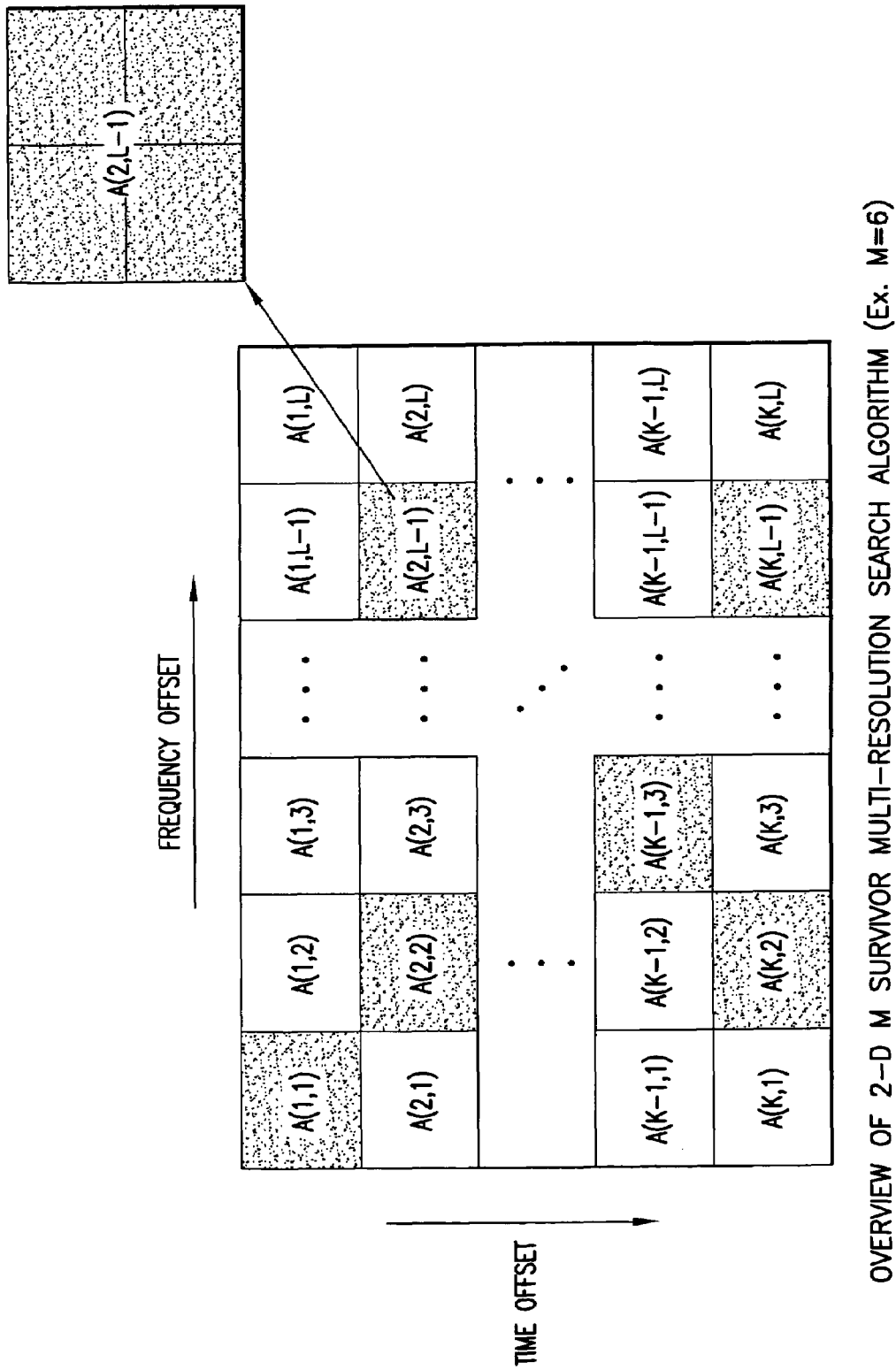

By way of introduction, the use of the exemplary embodiments of this invention overcome the problems inherent in the parameter search complexity encountered during use of ML joint synchronization and channel estimation. The joint estimator, in accordance with the exemplary embodiments of the invention, is based on a ML estimator. However, even though the performance of the ML estimator could be optimal, the very nature of ML algorithm implementation requires exhaustive parameter searches such that it is less attractive for a practical implementation. The exemplary embodiments of this invention overcome the search complexity resulting from the use of the ML-based joint synchronization and channel estimation process. Using improved search metrics and an improved search procedure, the exhaustive search problem of the conventional ML joint estimator is avoided through the use of the 2-D M survivor multi-resolution search algorithm in accordance with the exemplary embodiments of this invention.

The exemplary embodiments of this invention provide an improved solution for the practical implementation of a ML joint synchronization and channel estimation algorithm by the use of a novel search metric and a novel multi-resolution search scheme. While the procedure, in accordance with certain exemplary embodiments of this invention, may be considered to present a sub-optimal approach, the performance is shown to be competitive with conventional synchronization and channel estimation signal recovery techniques, while reducing the search complexity by more than 90% against the conventional brute force ML joint estimation approach. The 2-D M survivor multi-resolution search procedure, in accordance with the exemplary embodiments of this invention, is well suited for use with a number of applications such as, but certainly not limited to, SRD (software radio defined) communication products.

A detailed description of the ML joint synchronization and channel estimation procedure in accordance with the exemplary embodiments of this invention, is now made with reference to FIGS. 1-9.

ML Search Metric Derivation

A closed form of ML joint synchronization and channel estimation algorithm has been reported by Lim et al. A log-likelihood metric expression has been derived in terms of h, θ, and ε as:

$$\Lambda(h, \theta, \varepsilon) = - \sum_{k=\theta}^{\theta+N+N_h-1} |r(k) - \mu_k|^2 \quad (1a)$$

where h, θ, and ε represent a time-domain CIR, a time offset, and a frequency offset, respectively. Here, r(k) is a received signal, and $\mu_k$ is a convolved signal of a known transmitted training sequence (or a preamble) with a true channel, $$\mu_k = \begin{cases} \sum_{n=0}^{k-\theta} h(n)s(k-\theta-n)e^{\frac{j2\pi\varepsilon k}{N}} & k \in \{\theta, \theta+1, \ldots, \theta+N_h-1\} \\ \sum_{n=0}^{N_h-1} h(n)s(k-\theta-n)e^{\frac{j2\pi\varepsilon k}{N}} & k \in \{\theta+N_h, \theta+N_h+1, \ldots, \theta+N-1\} \\ \sum_{n=k-\theta-N}^{N_h-1} h(n)s(k-\theta-n)e^{\frac{j2\pi\varepsilon k}{N}} & k \in \{\theta+N, \theta+N+1, \ldots, \theta+N+N_h-1\}. \end{cases} \quad (1b)$$

Equations (1a) and (1b) are referred to collectively below as equation (1).

The closed form of channel estimation can be obtained by taking the partial derivative of the log-likelihood metric (1) with respect to the channel, h, yielding the following expression:

$$\nabla_{h_i}^c \Lambda(h, \hat{\theta}, \hat{\varepsilon}) = 0 \quad (2)$$

$$\hat{h}_i = \frac{1}{N\sigma_s^2} \sum_{k=\hat{\theta}+i}^{\hat{\theta}+N+i-1} r(k)s^*(k-\hat{\theta}-i)e^{\frac{j2\pi\hat{\varepsilon}k}{N}}$$

where $\hat{\theta}$ and $\hat{\varepsilon}$ represent the ML estimates of a time offset and a frequency offset that would be obtained from extensive ML parameter search operations. The equation (2) indicates that, if $\hat{\theta}$ and $\hat{\varepsilon}$ are found, $\hat{h}$ can be obtained immediately. However, Lim et al. do not consider an efficient search scheme to find those parameters, and instead assume the use of a brute force search scheme. This deficiency of a computationally efficient parameter search makes it difficult to justify the implementation of ML joint estimation since it would impose extensive computational loads.

In order to overcome these and other problems related to ML joint estimation, the exemplary embodiments of this invention provide a multi-resolution search algorithm that reduces the number of parameter search operations based on a modified search metric (related to equation (2)) instead of being based on the true ML search metric expressed in equation (1). Note that still the original ML search metric of equation (1) can be used with the 2-D M survivor parameter search algorithm to obtain the absolute answer if desired. But, this (sub-optimal) ML joint estimation approach is shown to reduce by a significant amount the required search metric computation, making it particularly attractive for use in bandwidth-limited and power-limited data processors, such as those found in portable battery-powered communication terminals. Also, the exemplary embodiments of the ML joint synchronization and channel estimation functionality may also be embodied in base stations and other types of equipment where data processor limitations are not as pronounced as they would be in a handheld terminal.

The following sub-sections discuss the details of the efficient search algorithm in accordance with the exemplary embodiments of this invention.

Efficient 2-D M Survivor Search Algorithm Overview

In general, the computational load of any ML search algorithm would depend on the parameter accuracy and the parameter search range. For example, under the frequency offset search range of (−100 KHz, 100 KHz), 100 Hz accuracy of the frequency offset estimation would require more search operations than 1000 Hz estimation accuracy. Similarly, the wider frequency offset search range would require more search operations. In addition, one can readily see that the more parameters required to estimate jointly, the more severe are the search operation loads.

As an alternative solution to reduce the amount of ML parameter search operations, in the exemplary embodiments of this invention a novel multi-resolution parameter search algorithm is provided where, from one search stage to the next search stage, the parameter resolution increases while the number of search operations at each search stage is fixed by a predefined number of survivors. This predefined number of survivors is referred to herein as M. The value of M is closely related to a probability of parameter detection. The larger M is, the more likely that the true parameter is included among the survivors. However, a larger M value implies more search computation to perform. Thus, a judicious choice is preferably made for the value of M. In addition, instead of using the true ML joint metric expressed in equation (1a), a different metric can be used to render a more computationally efficient search process. This different metric is based on the accumulated value of channel estimation as expressed in equation (2). Now, through the choice of this improved metric, that is different from the metric in equation (1), the search scheme can be identified as a sub-optimal ML scheme. But, if desired, the original ML metric in equation (1) can still be used to render the absolute ML scheme. However, the computational load of search metric calculation will increase accordingly.

It can be seen that the joint parameter search at each search stage generates a 2-D contour surface of the proposed search metrics. In general, the resolution of the contour surface is determined by the resolution of the input search parameter values. The more refined the search parameter inputs are (frequency offsets and time offsets), the more accurate the contour generated, thus providing a higher likelihood of accurately identifying a correct maxima/minima point to yield accurate parameter estimation. However, the high-resolution contour surface requires an increased amount of metric calculations and search operations, thus increasing computational loads. Contrarily, if far less refined inputs are used for the contour generation, less accurate maxima/minima point would be obtained, thus yielding less accurate parameter estimation. So, the search grid based on the search input resolution plays an important role in obtaining parameter estimation accuracy.

Figure 2:
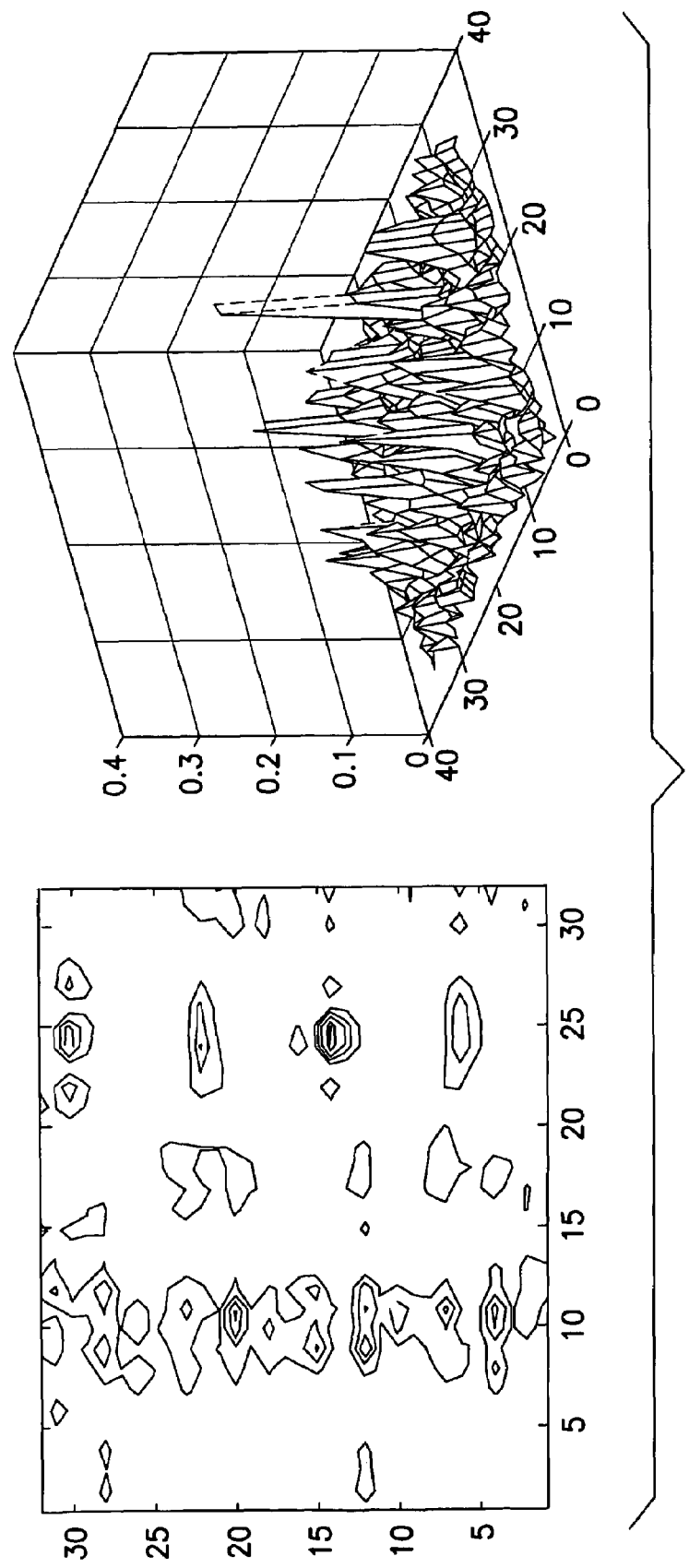
FIG. 2 illustrates an exemplary 2-D contour surface image that is related to the 2-D M survivor multi-resolution search algorithm of FIG. 1.
Figure 8:
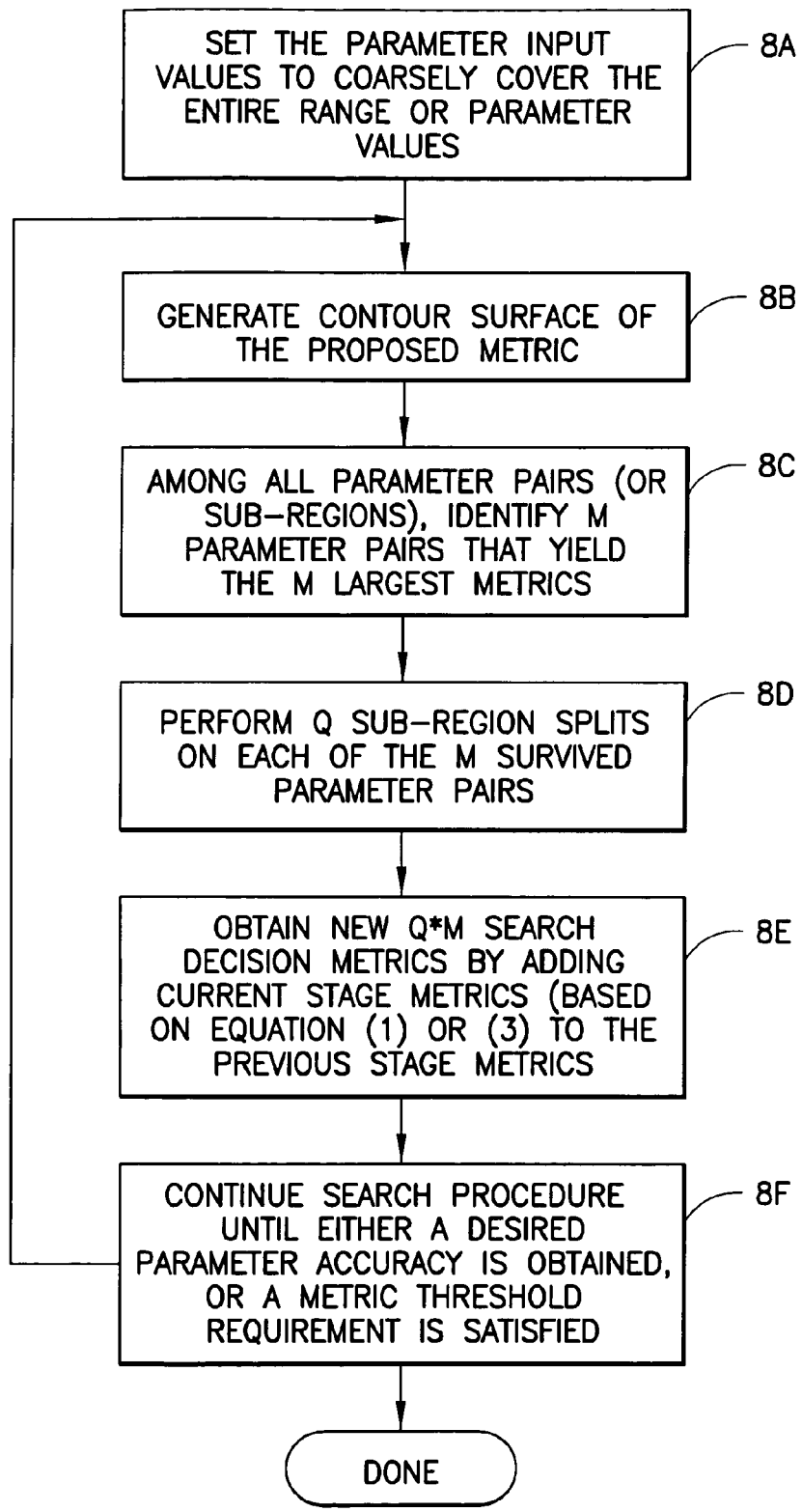
FIG. 8 depicts a logic flow diagram that is illustrative of a method in accordance with the 2-D M survivor multi-resolution search algorithm of this invention.

Based on these insights, the following efficient search algorithm is provided. Reference is also made to FIG. 8. First, the algorithm sets the search parameter values coarsely to cover the entire range within which desired parameter values exist (Block 8A). Each pair of coarse parameters (frequency offset, time offset) can be considered to represent the center point of a disjoint sub-region (or grid) in the contour surface as shown in FIG. 1a. For example, in FIG. 1a, L frequency offset values and K time offset values are chosen initially to cover the entire parameter search range. Based on these parameter pairs, the contour surface of the proposed metric is generated as shown in FIG. 2 (Block 8B). Next, among all parameter pairs (or sub-regions), the search algorithm identifies M parameter pairs that yield the M largest metrics (Block 8C). Each stage search metric can be obtained either based on the true ML metric in equation (1a) or the sub-optimal ML metric in equation (2). These surviving M parameter pairs are carried into the next search stage to conduct the further refined parameter search. In the next search stage, each of the surviving M parameter pairs undergoes Q sub-region splits generating Q more refined search candidates (Block 8D). The new decision making metrics of Q*M search candidates are obtained by adding current stage metrics (based on equation (1a and 1b) or (3) below) to the previous stage metrics (Block 8E). Again, the M largest metrics among Q*M candidates are selected to continue more refined search process in the next stage. As this search process continues, the parameter search region becomes smaller, thus yielding more refined parameter pairs. Note that one main premise that underlies this search technique is that each search stage increases the metric to enhance the correct convergence to the correct parameters. In this respect, the number of initial search regions and the choice of M are important considerations to ensure a correct search operation. This search procedure may continue until either a desired parameter accuracy has been obtained, or some metric threshold requirement is satisfied (Block 8F). A simple example of the prescribed search procedure is illustrated in FIG. 1b for M=2.

Search Algorithm Implementation on ML Joint Synchronization and Channel Estimation As mentioned earlier, as opposed to using the true ML metric for the search process, a closed form expression of channel estimation from equation (2) can be used instead, for the search metric calculation, to reduce the computational load of metric calculation:

$$\overline{\Lambda}(\theta_i, \varepsilon_i) = \left| \frac{1}{N\sigma_s^2} \sum_{k=\theta_i}^{\theta_i+N-1} r(k)s^*(k-\theta_i)e^{-\frac{j2\pi\varepsilon_i k}{N}} \right|^2. \quad (3)$$

Here, two unknown parameters to be searched are a time offset, $\theta_i$, and a frequency offset, $\varepsilon_i$. First, define $(F_{min}, F_{max})$ and $(T_{min}, T_{max})$ to be the search ranges of a frequency offset and a time offset, respectively. Further, let $T_R$ and $F_R$ represent the desired estimation resolution for the time offset and the frequency offset. Also, initially set L frequency offset values and J time offset values to uniformly cover the entire parameter search range. These procedures thus render L*J search metrics based on L*J sub-regions (or parameter pairs):

$$\overline{\Lambda}(\theta_j, \varepsilon_l) 1 \leq j \leq J \, 1 \leq l \leq L.$$

Among the L*J sub-regions (or parameter pairs), only M sub-regions are selected based on the metric observation of equation (3). The parameter estimation accuracy after the initial search is now within $$\left[-\frac{(F_{min}-F_{max})}{2L},\frac{(F_{min}-F_{max})}{2L}\right] \text{ and } \left[-\frac{(T_{min}-T_{max})}{2J},\frac{(T_{min}-T_{max})}{2J}\right]$$

for the frequency offset and the time offset, respectively. Next, each surviving M sub-region is further divided by D equally spaced refined frequency offsets and G equally spaced refined time offsets. Thus, this parameter search refinement process renders M*D*G refined sub-regions. The process then calculates the accumulated ML metrics of the M*D*G sub-regions (that is previous stage metrics of the surviving M sub-regions plus the current stage search metric based on equation (3)) and selects only M sub-regions with M largest accumulated search metrics for the next search stage. If desired, the search metric accumulation of each stage can be based on the true ML metric in equation (1). The estimation accuracy range now becomes $$\left[-\frac{(F_{min}-F_{max})}{2LD},\frac{(F_{min}-F_{max})}{2LD}\right] \text{ and } \left[-\frac{(T_{min}-T_{max})}{2JG},\frac{(T_{min}-T_{max})}{2JG}\right]$$

for the frequency offset and the time offset, respectively. In this fashion, if $N_{stage}$ searches have been conducted to meet a search stop requirement, the total number of search operations is $L \cdot J + (N_{stage}-1) \cdot M \cdot D \cdot G$, and the final parameter estimation accuracy is within $$\left[-\frac{(F_{min}-F_{max})}{2L(D^{N_{sstage}-1})},\frac{(F_{min}-F_{max})}{2L(D^{N_{sstage}-1})}\right] \text{ and } \left[-\frac{(T_{min}-T_{max})}{2J(G^{N_{sstage}-1})},\frac{(T_{min}-T_{max})}{2J(G^{N_{sstage}-1})}\right]$$

for the frequency offset and the time offset, respectively. On the other hand, if a brute force ML search were used to obtain the desired parameter accuracy of $T_R$ and $F_R$, the total number of search operations would be $$ceil\left[\frac{(F_{min}-F_{max})}{2F_R}\right] \times ceil\left[\frac{(T_{min}-T_{max})}{2T_R}\right]$$

where a "ceil" function is an integer round function toward infinity.

Figure 3:
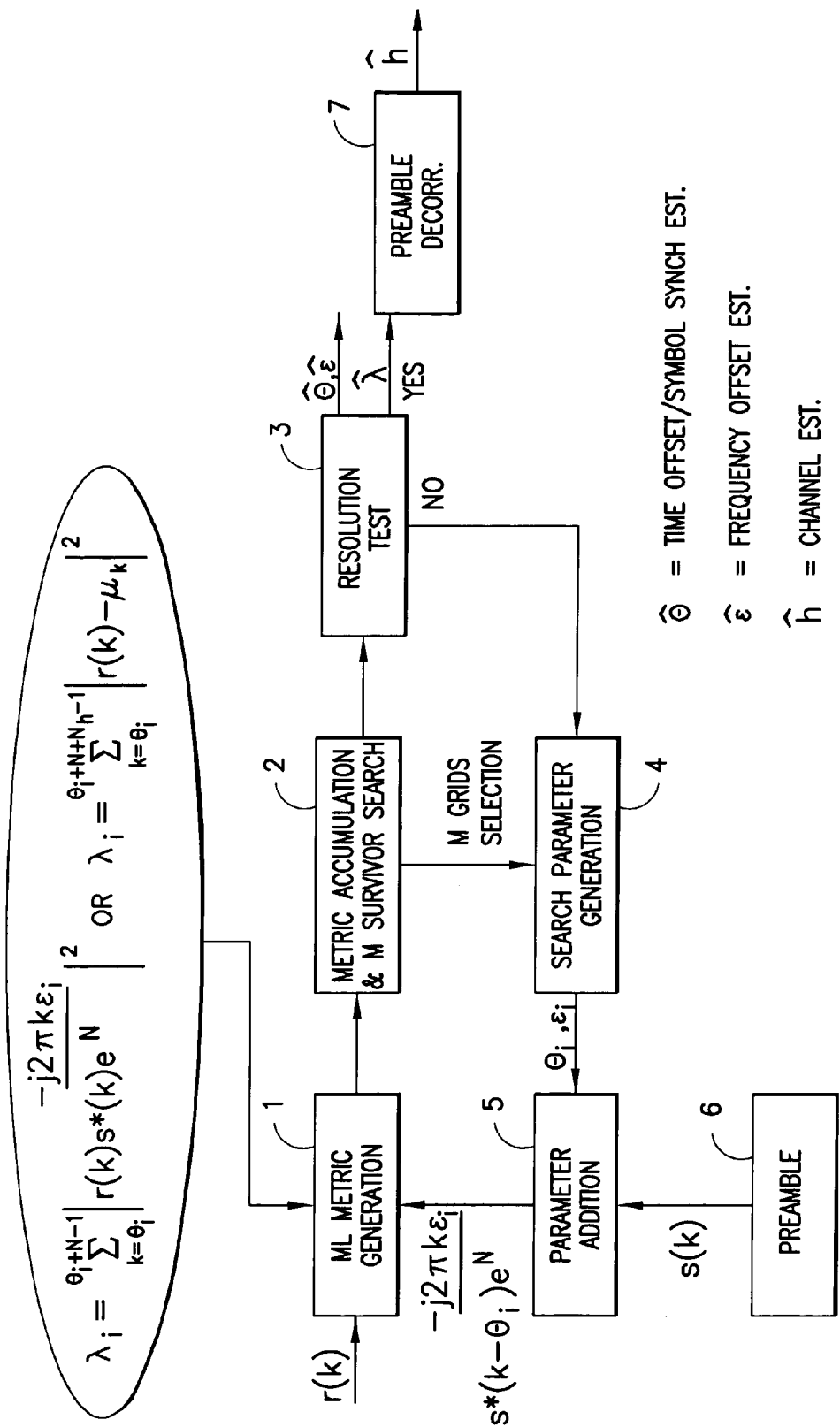
FIG. 3 shows a simplified block diagram of a ML joint estimator with the 2-D M survivor multi-resolution search algorithm in accordance with exemplary embodiments of the invention.

FIG. 3 shows a simplified block diagram of a ML joint estimator with M Survivor search algorithm in accordance with exemplary embodiments of the invention. The input signal r(k) is applied to a ML Metric Generation block 1 that outputs a generated metric to a block 2 labeled Metric Accumulation and M Search Algorithm that operates in accordance with the exemplary embodiments of this invention. The Metric Accumulation and M Search Algorithm block 2 provides an output to a Resolution Test block 3 and an M Grids Selection signal to a Parameter Generation block 4. If the desired resolution test is not passed the Resolution Test block 3 signals the Search Parameter Generation block 4, which outputs a new Time Offset/Symbol Synchronization estimate and a Frequency Offset estimate to a Parameter Addition block 5, which also receives the Preamble from block 6. The output of the Parameters Addition block 5 is applied back to the ML Metric Generation block 1 that computes new ML metrics accordingly. When the resolution test is passed, the Resolution Test block 3 provides an output to a Preamble Decorrelation block 7 that outputs a channel estimate accordingly.

The individual blocks shown in FIG. 3 can be implemented as computer program code that is stored in a tangible computer-readable medium for execution by a suitable data processor, such as a digital signal processor (DSP), or implemented as dedicated hardware circuits, or as a combination of program code and hardware circuits.

Channel Estimation Enhancement for Non Ideal Preamble Signal

The closed form expression of ML channel estimates in the equation (2) is based on the following preamble signal orthogonal assumption:

$$E\{s(a)s^*(b)\} = \frac{1}{N}\sum_{n=0}^{N-1}\sum_{m=0}^{N-1}E\{X_nX_m^*\}e^{\frac{j2\pi(na-mb)}{N}} \quad (4)$$

$$= \frac{1}{N}\sum_{m=0}^{N-1}E\{X_nX_n^*\}e^{\frac{j2\pi(a-b)n}{N}}$$

$$= \frac{1}{N}E\{|X|^2\}\sum_{n=0}^{N-1}e^{\frac{j2\pi(a-b)n}{N}}$$

$$= \begin{cases} \sigma_s^2 & a=b \\ \sigma_s^2 & b=a+N, a\in CP \\ 0 & \text{otherwise} \end{cases}$$

where $X_n$ is the frequency domain signal of the preamble signal, s(k). However, it is possible that the preamble signal may not render the above properly. In this case, the channel estimation in equation (2) may not reflect the correct, channel estimates, and under the perfect synchronization assumption it can be shown that the channel estimation in equation (2) can be expressed in the following vector equation:

$$\bar{h} = \begin{bmatrix} \hat{h}_0 \\ \hat{h}_1 \\ \vdots \\ \hat{h}_{N_m-1} \end{bmatrix} \quad (5)$$

$$= \frac{1}{N\sigma_s^2}\begin{bmatrix} \bar{r}^T(0)\cdot\bar{s}^*(0) \\ \bar{r}^T(1)\cdot\bar{s}^*(0) \\ \vdots \\ \bar{r}^T(N_m-1)\cdot\bar{s}^*(0) \end{bmatrix}.$$

where $$\bar{r}(k) = \begin{bmatrix} r(k) \\ r(k+1) \\ \vdots \\ r(k+N-1) \end{bmatrix}$$

$$\bar{s}(k) = \begin{bmatrix} s(k) \\ s(k+1) \\ \vdots \\ s(k+N-1) \end{bmatrix}$$

and $(\cdot)^T$ and $(\cdot)^*$ represent a transpose operation and a conjugate operation respectively. N, $N_m$, and $\sigma_s^2$ are the number of received signals, the channel length, and the signal power. The first channel estimation tap in equation (5) can be expressed as follows:

$$\hat{h}_0 = \bar{r}^T(0) \cdot \bar{s}^*(0) \quad (6)$$

$$= [h(0) \quad h(1) \quad \cdots \quad h(N_m - 1)] \begin{bmatrix} s(0) & s(1) & \cdots & s(N-1) \\ s(-1) & s(0) & \cdots & s(N-2) \\ \vdots & \vdots & \ddots & \vdots \\ s(-N_m+1) & s(-N_m+2) & \cdots & s(N-N_m) \end{bmatrix} \begin{bmatrix} s^*(0) \\ s^*(1) \\ \vdots \\ s^*(N-1) \end{bmatrix}$$

$$= [h(0) \quad h(1) \quad \cdots \quad h(N_m - 1)] \begin{bmatrix} r_{ss^*}(0) \\ r_{ss^*}(-1) \\ \vdots \\ r_{ss^*}(-N_m+1) \end{bmatrix}$$

$$= h(0)r_{ss^*}(0) + h(1)r_{ss^*}(-1) + \cdots + h(N_m-1)r_{ss^*}(-N_m+1)$$

where $$r_{ss^*}(n) = \sum_{k=0}^{N-1} s(k+n)s^*(k) \quad (7)$$

represents the autocorrelation of the preamble signal with an offset index, n.

Equation (6) clearly shows that the first tap of channel estimation contains preamble autocorrelation coefficient terms along with the desired term of $h(0)r_{ss^*}(0)$. Note that the normalized preamble signal will yield $r_{ss^*}(0)=1$. Thus, if the preamble signal has the orthogonal condition described in equation (4), then, $\hat{h}_0 = h(0)$ can be obtained. If not, the correlation noises will be present in the channel estimate expression of equation (2). By extending equations (6) and (7), the channel estimates expression of equation (5) can be rewritten as:

$$\bar{h} = \begin{bmatrix} \hat{h}_0 \\ \hat{h}_1 \\ \vdots \\ \hat{h}_{N_m-1} \end{bmatrix} \quad (8)$$

$$= \frac{1}{N\sigma_s^2} \underbrace{\begin{bmatrix} \bar{r}_{ss^*}(0) \\ \bar{r}_{ss^*}(-1) \\ \vdots \\ \bar{r}_{ss^*}(-N_m+1) \end{bmatrix}}_{R_{ss^*}} \tilde{h}$$

$$= R_{ss^*} \tilde{h}$$

where $$\bar{r}_{ss^*}(k) = [r_{ss^*}(k) r_{ss^*}(k-1) \ldots r_{ss^*}(k-N_m+1)]$$

is the preamble signal autocorrelation matrix, and $\tilde{h}$ is a true channel impulse response vector. Equation (8) suggests a simple solution to obtain more refined channel estimates by multiplying the inverse matrix of autocorrelation matrix, $R_{ss^*}$.

$$\tilde{h} = N\sigma_s^2 \cdot (R_{ss^*})^+ \bar{h} \quad (9)$$

where $(\cdot)^+$ represents the pseudo inverse matrix operation. Note that the inverse matrix of the preamble correlation matrix, $(R_{ss^*})^+$, can be calculated in advance, stored in memory, and retrieved from the memory for the final channel estimation enhance procedure if needed. In general, most preamble signals yield no true self-orthogonal property, and this channel estimation refinement process can extend the performance versatility of the sub-optimal ML joint estimator in accordance with the exemplary embodiments of this invention to incorporate different types of preamble structures.

Simple Numerical Illustration for Search Reduction

A simple example is now provided in order to demonstrate the benefit of the search reduction made possible by using the search algorithm in accordance with the exemplary embodiments of this invention. Let the initial 2-D parameter search ranges be (−50 KHz, 50 KHz) for the frequency offset and (1,256) for the time offset. Assume that the desired parameter estimation accuracy is within [−100, 100] Hz and one sample for the frequency offset and the time offset estimates when the final search stage is reached. The conventional brute force search procedure would require the search combination of 100K/200=500 frequency offset parameters and 256/1=256 time offset parameters, which is equal to 500*256=128,000 parameter pair searches. Now, a consideration is made of a total number of searches used by the 2-D M survivor multi-resolution search algorithm in accordance with the exemplary embodiments of this invention. Assume that the number of initial sub-regions (or parameter pairs) is 32×32=1024 and M=32. The initial (first) search will use 32×32=1024 searches, while the parameter estimation accuracy is within 100K/32=[−1.5626, 1.5626] KHz and 256/32=[−4, 4] samples. Among the 1024 initial sub-regions, only M=32 of them are selected based on the metrics in accordance with the exemplary embodiments of this invention. If four sub-region splits are assumed for this example, the total number of searches used for the second stage is 32×4=128. The new metrics are compounded from the metrics of previous search stages. Again, among 128 search ranges only M=32 are selected based on their accumulated search metrics. The parameter accuracy for the frequency offset and the time offset after the second search stage is 1.5626/2=[−780, 780] Hz and [−2 2] sample. The third stage uses another 128 searches with the parameter accuracy of [−360, 360] Hz and [−1 1] sample, and the forth search stage would use another 128 searches while rendering the frequency parameter accuracy of [−180, 180] Hz and a desired time sample for the time offset such that the time offset search refinement can be stopped. Finally, after the fifth search stage, the desired frequency offset estimation accuracy of [−90 90] Hz has been obtained. The total number of search operations required for the 2-D M survivor multi-resolution search algorithm, in accordance with the exemplary embodiments of this invention, is 1024+128*4=1536 searches, which is only 1536/128000=1.2% of the number of searches required for the conventional brute force searching approach.

Computer Simulation Results

Computer simulations have been conducted to illustrate the operation of the 2-D M survivor multi-resolution search algorithm and to evaluate its performance. The main simulation setting is based on IEEE 802.16e specifications as shown in the following table.

| | |
|---|---|
| IFFT/FFT Size | 256 |
| Preamble Length | 576 Samples (2 OFDM Symbols) |
| CP Length | 32 Samples |

-continued

| | |
|---|---|
| IFFT/FFT Size | 256 |
| Signal BW | 5 MHz |
| Carrier Frequency | 2.4 GHz |
| Channel | ITU Pedestrian A with 3 Km/Hr |
| Modulation | QPSK |
| Frequency Offset | 10 KHz |

The following table shows the simulation parameters related to the sub-optimal ML search algorithm in accordance with the exemplary embodiments of this invention.

| M | 16 |
|---|---|
| Time Offset Search Range | (1, 64) Samples |
| Frequency Offset Search Range | (−50K, 50K) KHz |
| Used Preamble Length | 128, 256 Samples |
| Initial Search Region | 32 × 32 = 1024 |
| Target Frequency Offset Est. Accuracy | [−100, 100] Hz |
| Target Time Offset Est. Accuracy | 1 Sample |

Figure 4:
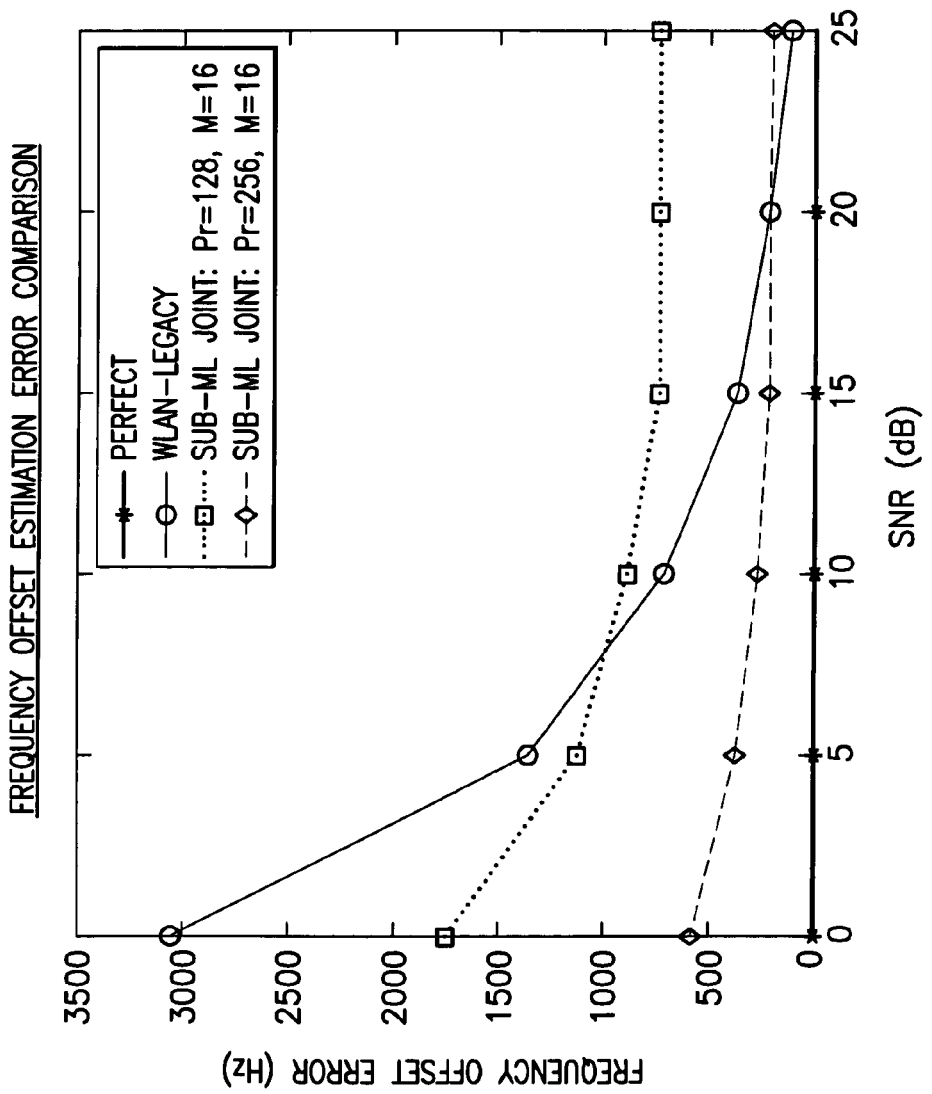
FIGS. 4, 5, 6 and 7 are graphs depicting simulation results of frequency offset estimation, simulation results of symbol synchronization success rate, simulation results of MSE channel estimation and a raw BER performance comparison, respectively.

FIG. 4 shows the mean square root error of frequency offset estimation. In this figure, the performance of the sub-optimal ML joint estimator is compared to the existing WLAN legacy frequency offset estimator whose algorithm is based on the auto correlation operation of the short preamble signal (256 samples long). For this computer simulation, however, its correlation length was set to 100. The figure shows that at low SNRs the sub-optimal ML joint estimator outperforms the WLAN legacy estimator. However, the WLAN legacy estimator exhibits increasing performance improvement as SNR increases while the proposed joint estimator seems to exhibit less prominent performance improvement as SNR increases. The sub-optimal ML joint estimator forms a performance error floor, which may be attributed to search parameter accuracy. As expected, when a shorter preamble signal (128 samples long) is used, higher estimation errors were observed. However, this residual frequency offset error can be corrected by the use of pilot symbols embedded in the data portion such that this small frequency offset error does not cause any significant BER performance degradation.

Figure 5:
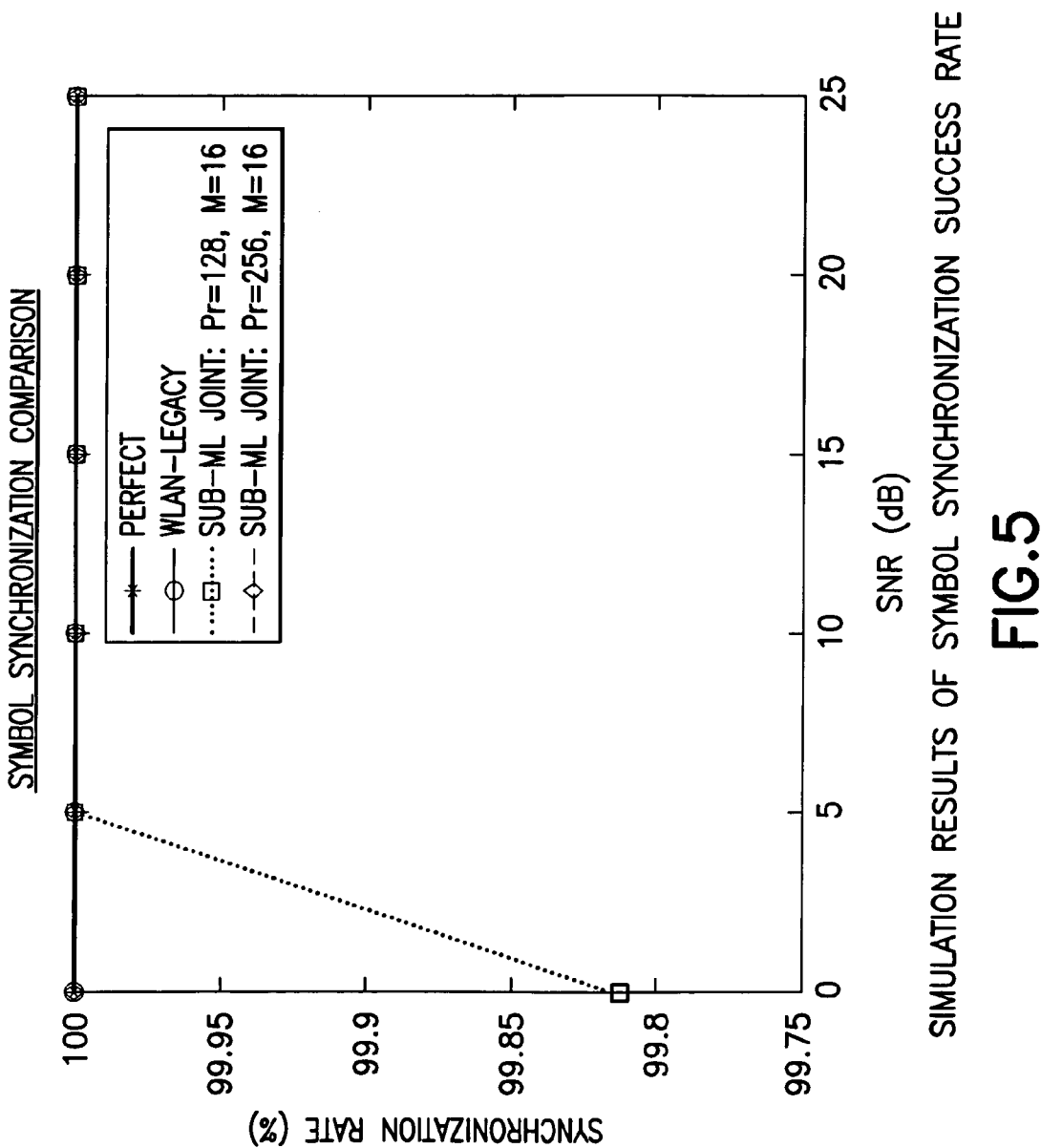

FIG. 5 shows the symbol synchronization success rate. The successful OFDM symbol synchronization is declared if the synchronization index estimate resides to the left of the CP and OFDM symbol boundary. To further ensure this symbol synchronization, an arbitrary negative time offset (e.g., −4) is added on the top of the estimated symbol index. The WLAN legacy synchronization algorithm is also based on the cross-correlation operation on the long preamble signal where its correlation window size was 128.

Figure 6:
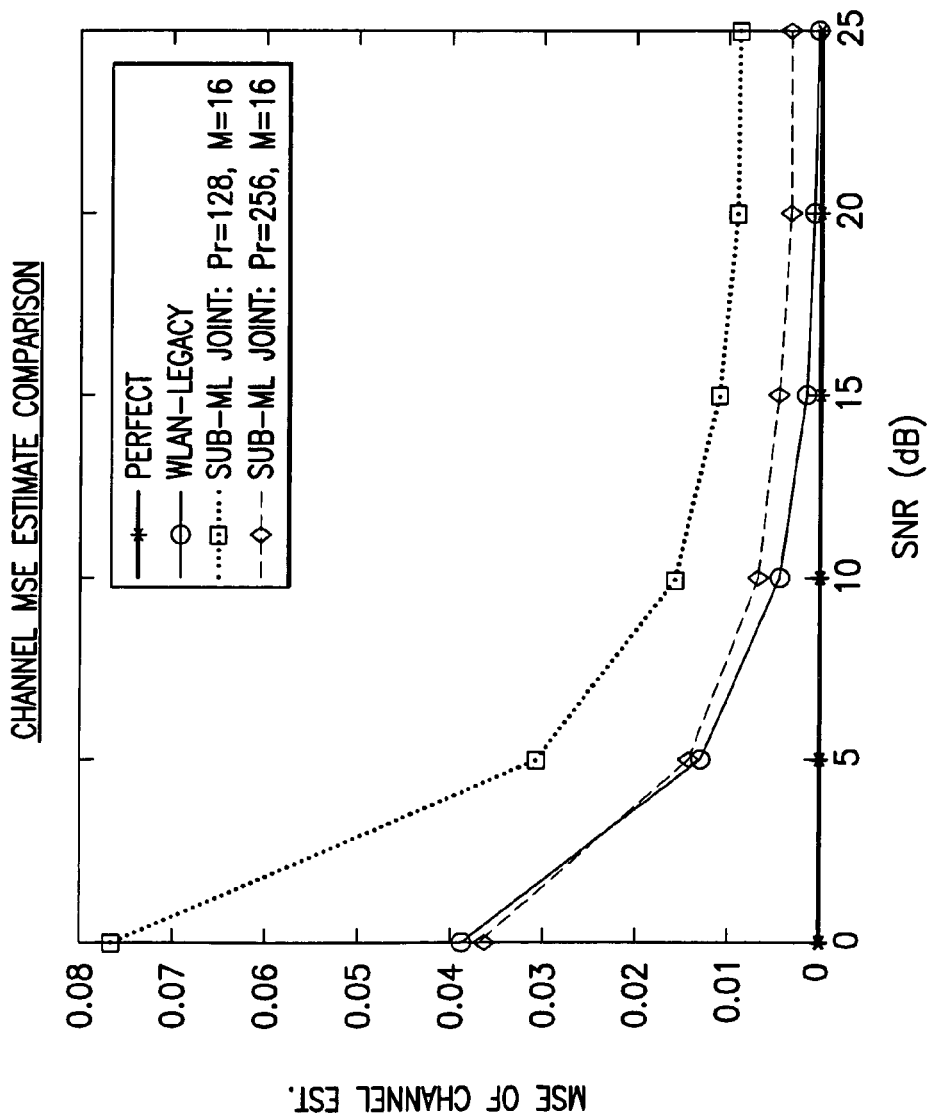

FIG. 6 shows the Mean Square Error (MSE) of channel estimation. The plot indicates that the length of the preamble plays an important role on the channel estimation performance. It can be noted that the WLAN legacy channel estimation (that exploits a 256 long preamble) seems to outperform slightly against the sub-optimal M joint channel estimator using a 256 long preamble. This can be attributed to fixed frequency offset estimate accuracy of ML joint estimator and a preamble signal SNR gain for WLAN legacy channel estimation where the signal sum of the first half and the second half of the received preamble signal is used.

Figure 7:
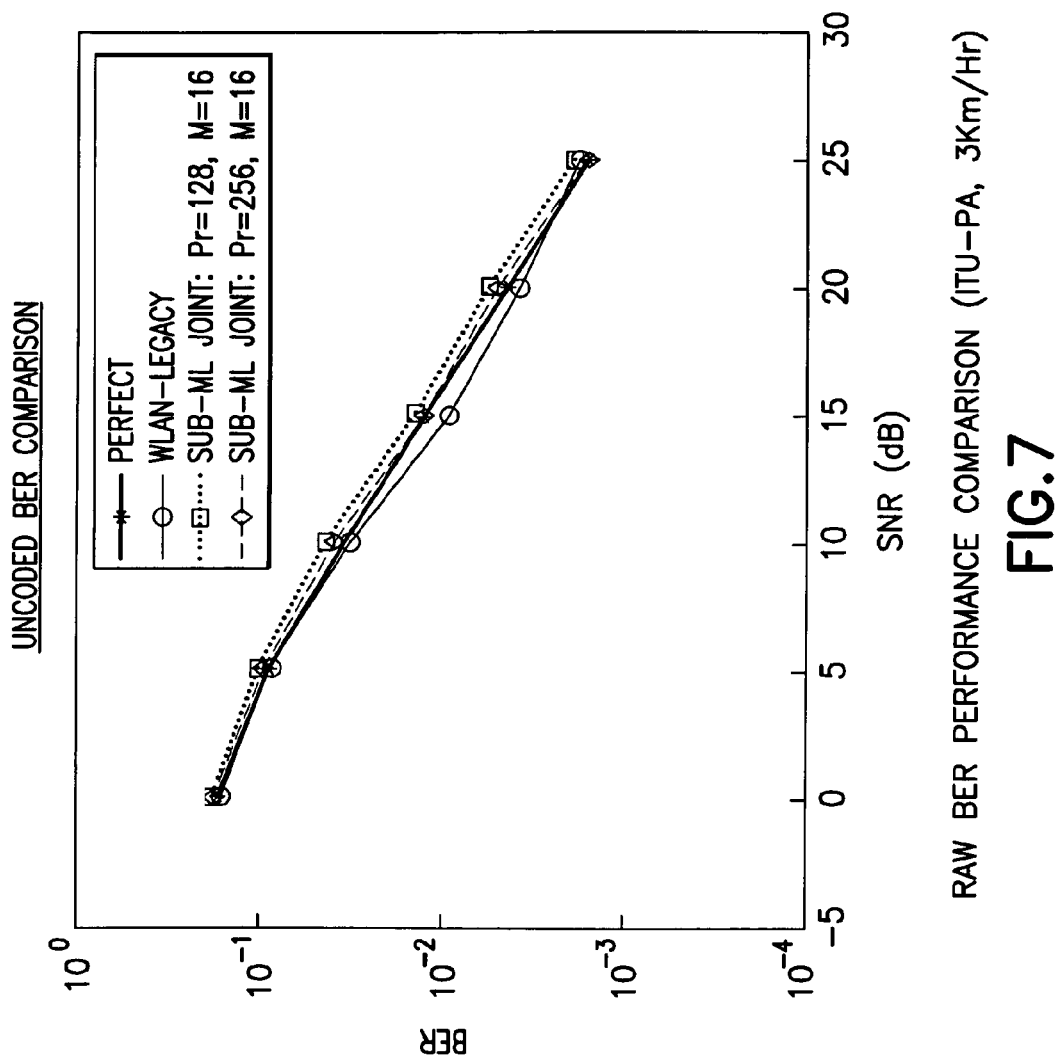

The BER performance curve is presented in FIG. 7. No considerable performance difference can be observed between the sub-optimal ML joint algorithm, in accordance with the exemplary embodiments of this invention, and the existing WLAN legacy algorithm. However, the WLAN legacy synchronization and channel estimation algorithm uses a preamble signal of 576 samples while the sub-optimal M joint estimation algorithm uses either a 128 or a 256 samples long preamble signal. So, the simulation results show that the sub-optimal M joint estimation can achieve comparable BER performance to the existing legacy algorithm while reducing the preamble signal length. The total number of parameter searches by the sub-optimal M joint estimator is equal to [initial_search_points+M*4*(N_search-1)]=1024+16*4*4=1280. If the brute force search had been implemented instead, the total number of searches would have been 500*64=32,000. This shows a search reduction of about 96%.

Based on the foregoing, it can be appreciated that one non-limiting feature of this invention is that it provides a computationally efficient search method for performing the ML joint estimation process, without incurring any significant synchronization and/or channel estimation performance degradation. The use of the exemplary embodiments of this invention further enables a reduction in the preamble length, while still achieving competitive synchronization and channel estimation performance against conventional synchronization and channel estimation approaches. The use of the exemplary embodiments of this invention further enables the receiver to perform synchronization and channel estimation with any given preamble structure.

It is pointed out that the crux of ML joint synchronization and channel estimation is finding an efficient search algorithm to reduce parameter search (namely, frequency offset, time offset, and channel estimation) complexity while maintaining good parameter estimation based on a true or sub-optimal ML search metric. Referring again to the Pun et al. article cited above, the search algorithm of this article is based on a type of sequential iterative one-dimensional projection search based on a ML metric:

$$\Pi(\tilde{\mu},\tilde{h}')=\|y-G(\hat{\omega},\tilde{\mu},\tilde{h}')\|,$$

where $(\hat{\omega},\tilde{\mu},\tilde{h}')$ are a fixed (or some guessed) frequency offset estimate, a time offset estimate, and a channel estimate, respectively. The ML search metric employed by Pun et al. is $$\hat{\mu} = \arg\max_{\tilde{\mu}}\{\|P_G(\hat{\omega},\tilde{\mu})y\|^2\}$$

which is used to determine the time offset estimate. Pun et al. implement what they refer to as an alternating-projection timing estimator (APTE), which is an iterative projection approach to find $\hat{\mu}$. Finally, Pun et al. compute the channel estimation based on $\hat{h}'=[G^H(\hat{\omega},\hat{\mu})G(\hat{\omega},\hat{\mu})]^{-1}G^H(\hat{\omega},\hat{\mu})y$. Their sub-optimal approach appears to be related to replacing the original argument of $\|P_G(\hat{\omega},\hat{\mu})y\|$ with $\|S^H(\tilde{\mu}_k)\hat{\xi}_k\|$ for their search metric.

As should be apparent, the approach of Pun et al. is significantly different from the ML joint approach described above in the context of the exemplary embodiments of this invention. In accordance with the exemplary embodiments of this invention, the search metric is an accumulated value of either a true ML metric based on equation (1) or the sub-optimal ML metric described in equation (2):

$$\bar{\Lambda}(\theta_i, \varepsilon_i) = \left| \frac{1}{N\sigma_s^2} \sum_{k=\theta_i}^{\theta_i+N-1} r(k)s^*(k-\theta_i)e^{-\frac{j2\pi\varepsilon_i k}{N}} \right|^2.$$

This metric is closely related to the channel estimate. The time offset and frequency offset are obtained through the use of the 2-D M survivor multi-resolution search algorithm. Pun et al mentioned that their parameter search approach is to avoid this multi-resolution approach, thus relying on an iterative one dimensional projection search algorithm. Also, channel estimates of the proposed invention can be obtained directly from the metric calculation itself:

$$\hat{h}_i = \frac{1}{N\sigma_s^2} \sum_{k=\hat{\theta}+i}^{\hat{\theta}+N+i-1} r(k)s^*(k-\hat{\theta}-i)e^{-\frac{j2\pi\hat{\varepsilon}k}{N}},$$

which is different from their least square approach of channel estimation:

$$\hat{h}' = [G^H(\hat{\omega},\hat{\mu})G(\hat{\omega},\hat{\mu})]^{-1}G^H(\hat{\omega},\hat{\mu})y.$$

An element of the 2-D M survivor multi-resolution search procedure, made possible by the use of the exemplary embodiments of this invention, may be considered to employ a signal correlation operation. Further, the 2-D M survivor multi-resolution search procedure, in accordance with the exemplary embodiments of this invention, may be viewed as a preamble-oriented operation and, thus, it may be less relevant to waveforms (e.g., OFDM, CDMA or GSM) that are used so long as it is preferably used in a preamble-based data transmission system.

Figure 9:
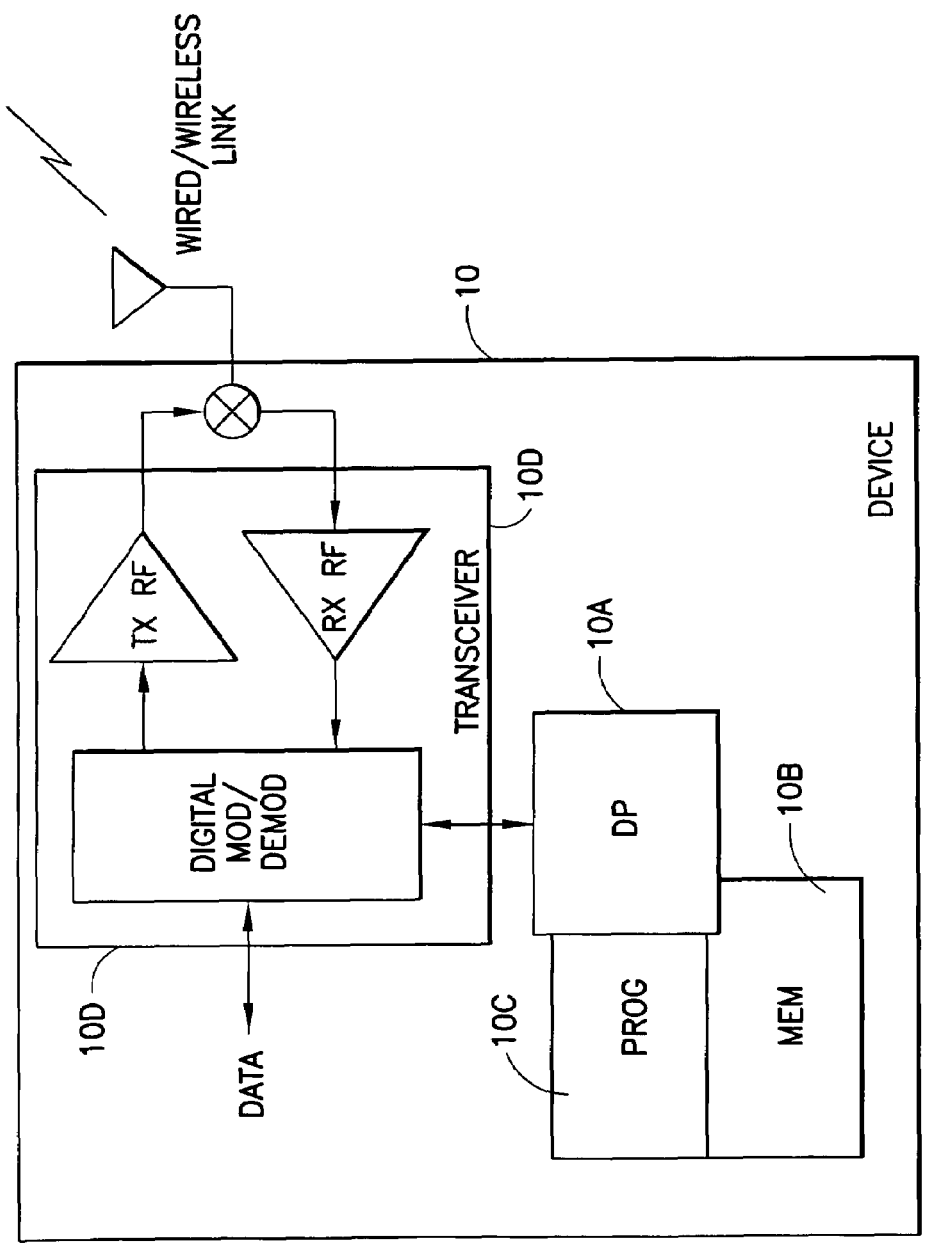
FIG. 9 shows a simplified block diagram of one non-limiting embodiment of an electronic device that is suitable for use in practicing the exemplary embodiments of this invention.

Reference is made to FIG. 9 for illustrating a simplified block diagram of one example of an electronic device 10 that is suitable for use in practicing the exemplary embodiments of this invention. The device 10 includes at least one data processor (DP) 10A, a memory (MEM) 10B that stores a program (PROG) 10C and may also include a radio frequency (RF) transceiver 10D for bidirectional wireless/wired communication over a wireless/wired link. The transceiver 10D can include a radio frequency transmitter (TX RF), a radio frequency receiver (RX RF) and a digital modulator/demodulator (MOD/DEMOD). The MEM 10B can store the received data and intermediate processing data and the PROG 10C can include program instructions that, when executed by the DP 10A, enable the electronic device to operate in accordance with the exemplary embodiments of this invention, as described in detail above.

It should be noted that for those embodiments where the ML joint synchronization and channel estimation functionality is embodied in hardware circuitry, this circuitry, such as that shown in FIG. 3, can be implemented in whole or in part in the receiver. It should be further noted that the transmitter is shown for convenience, but is not required for operation of the exemplary embodiments of this invention. It should be noted further still that the wireless link and antenna may be eliminated, as the exemplary embodiments of this invention are suitable for use as well with signals received over a wired connection, such as a cable or a fiber optic.

In general, the various embodiments of the device 10 can include, but are not limited to, cellular telephones, base stations, personal digital assistants (PDAs) having wired or wireless communication capabilities, portable computers having wired or wireless communication capabilities, image capture devices such as multi-media devices (digital video and cameras) having wired or wireless communication capabilities, gaming devices having wired or wireless communication capabilities, music storage and playback appliances having wired or wireless communication capabilities, Internet appliances permitting wireless or wired Internet access and browsing, as well as portable units or terminals that incorporate combinations of such functions.

The MEM 10B may be of any type suitable to the local technical environment and may be implemented using any suitable data storage technology, such as semiconductor-based memory devices, magnetic memory devices and systems, optical memory devices and systems, fixed memory and removable memory. The DP 10A may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof, including PGAs. In general, the exemplary embodiments of this invention may be implemented using at least one of fixed and programmable circuitry. Note as well that the blocks of FIG. 8 may be viewed as a sequence of logical steps or procedures, or as a block diagram in interconnected functional modules or units.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif., can automatically route conductors and locate components on a semiconductor chip using well established rules of design as well as libraries of pre-stored design modules. Once the design for a semiconductor circuit has been completed, the resultant design, in a standardized electronic format (e.g., Opus, GDSHII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. For example, the value of M may be adjusted between search stages thus enabling it to become adaptive. However, any and all modifications of the teachings of this invention will still fall within the scope of the non-limiting embodiments of this invention. Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   operating a receiver to receive a signal over a channel;
   processing the received signal by executing a two-dimensional (2-D) M survivor multi-resolution search from one search stage to a next search stage by increasing parameter resolution while fixing a number of search operations at each search stage by a predetermined number of parameter survivors, where M is an integer; and
   determining one of a Maximum Likelihood joint metric or a sub-optimum Maximum Likelihood joint metric based on an accumulated value of survived search stages.

2. A method as in claim 1, implementing a joint frequency and time synchronization and channel estimation procedure for the receiver.

3. A method as in claim 1, where the parameters are comprised of frequency offset and time offset parameter pairs.

4. A device, comprising means for executing a two-dimensional (2-D) M survivor multi-resolution search for a signal received over a channel, where M is an integer, and including means for increasing parameter resolution and fixing a number of search operations at each search stage by a predetermined number of parameter survivors, said increasing and fixing means operable from one search stage to a next search stage, and means for defining a Maximum Likelihood joint metric or a sub-optimum Maximum Likelihood joint metric based on an accumulated value of survived search stages.

5. A device as in claim 4, where the search means implements a joint frequency and time synchronization and channel estimation procedure for a receiver.

6. A device as in claim 4, where the parameters are comprised of frequency offset and time offset parameter pairs.

7. A computer-readable memory that stores computer program instructions, execution of said computer program instructions resulting in operations comprising:
   in response to receiving a signal, implementing a joint frequency and time synchronization and channel estimation Maximum Likelihood parameter search function for the received signal by
   setting values of frequency offset and time offset parameter pairs to coarsely cover a search range;
   generating a contour surface of a search metric corresponding to the parameter pairs;
   among all parameter pairs, identifying surface regions corresponding to M surviving parameter pairs that yield M largest metrics;
   splitting individual surface regions corresponding to the M survived parameter pairs into a plurality n of sub-regions, where n and M are integers;
   obtaining n*M search decision metrics by adding current search stage metrics to previous search stage metrics; and
   iterating from generating the contour surface until finished.

8. The computer-readable memory as in claim 7, where iterating is performed until a desired parameter accuracy is obtained or a metric threshold requirement is satisfied.

9. The computer-readable memory as in claim 7, where each parameter pair represents a center point of a disjoint sub-region in the contour surface.

10. The computer-readable memory as in claim 7, where a search metric at each stage calculation is performed using:

$$\overline{\Lambda}(\theta_i, \varepsilon_i) = \left| \frac{1}{N\sigma_s^2} \sum_{k=\theta_i}^{\theta_i+N-1} r(k)s^*(k-\theta_i)e^{-\frac{j2\pi\varepsilon_i k}{N}} \right|^2 \text{ or}$$

$$\Lambda(h, \theta, \varepsilon) = -\sum_{k=\theta}^{\theta+N+N_h-1} |r(k) - \mu_k|^2,$$

where $\theta$, $\varepsilon$, and $N_h$ are a time offset, a frequency offset and an approximate channel length, respectively, and $r(k)$ is the received signal, where N is a number of received signals, and where each channel tap element is estimated in accordance with:

$$\hat{h}_i = \frac{1}{N\sigma_s^2} \sum_{k=\hat{\theta}+i}^{\hat{\theta}+N+i-1} r(k)s^*(k-\hat{\theta}-i)e^{-\frac{j2\pi\hat{\varepsilon}k}{N}}.$$

11. The computer-readable memory as in claim 7, further comprising obtaining a channel estimate by multiplying with an inverse matrix of autocorrelation matrix, $R_{SS}$:

$$\tilde{h} = N\sigma_s^2 \cdot (R_{ss}\cdot)^+ \overline{h},$$

where $\tilde{h}$ is a true channel impulse response vector, N is a number of received signals, $\sigma_s^2$ is the signal power and where $(\cdot)^+$ represents a pseudo inverse matrix operation.

12. A method, comprising:
    operating a receiver to receive a signal;
    processing the received signal by executing a joint frequency and time synchronization and channel estimation Maximum Likelihood parameter search function for the received signal, where processing comprises setting values of frequency offset and time offset parameter pairs to coarsely cover a search range;
    generating a contour surface of a search metric corresponding to the parameter pairs;
    among all parameter pairs, identifying surface regions corresponding to M surviving parameter pairs that yield M largest metrics;
    splitting individual surface regions corresponding to the M survived parameter pairs into a plurality n of sub-regions, where n and M are integers;
    obtaining n*M search decision metrics by adding current search stage metrics to previous search stage metrics; and
    iterating from generating the contour surface until finished.

13. The method as in claim 12, where iterating is performed until a desired parameter accuracy is obtained or a metric threshold requirement is satisfied.

14. The method as in claim 12, where each parameter pair represents a center point of a disjoint sub-region in the contour surface.

15. The method as in claim 12, where a search metric calculation is performed using:

$$\overline{\Lambda}(\theta_i, \varepsilon_i) = \left| \frac{1}{N\sigma_s^2} \sum_{k=\theta_i}^{\theta_i+N-1} r(k)s^*(k-\theta_i)e^{-\frac{j2\pi\varepsilon_i k}{N}} \right|^2 \text{ or } \Lambda(h, \theta, \varepsilon) =$$

$$-\sum_{k=\theta}^{\theta+N+N_h-1} |r(k) - \mu_k|^2,$$

where θ, ε, and $N_h$ are a time offset, a frequency offset and an approximate channel length, respectively, and r(k) is the received signal, where N is a number of received signals, and where each channel tap element is estimated in accordance with:

$$\hat{h}_i = \frac{1}{N\sigma_s^2} \sum_{k=\hat{\theta}+i}^{\hat{\theta}+N+i-1} r(k)s^*(k-\hat{\theta}-i)e^{-\frac{j2\pi\hat{\varepsilon}k}{N}}.$$

16. The method as in claim 12, further comprising obtaining a channel estimate by multiplying with an inverse matrix of autocorrelation matrix, $R_{SS'}$:

$$\tilde{h} = N\sigma_s^2 \cdot (R_{ss'})^+ \bar{h},$$

where $\tilde{h}$ is a true channel impulse response vector, N is a number of received signals, $\sigma_s^2$ is the signal power and where $(\cdot)^+$ represents a pseudo inverse matrix operation.

17. An apparatus comprising circuitry configured to perform a joint frequency and time synchronization and channel estimation Maximum Likelihood parameter search function for a received signal, said circuitry comprising first circuitry configured to set values of frequency offset and time offset parameter pairs to coarsely cover a search range; second circuitry configured to generate a contour surface of a search metric corresponding to the parameter pairs; third circuitry configured to identify, among all parameter pairs, surface regions corresponding to M surviving parameter pairs that yield M largest metrics; fourth circuitry configured to split individual surface regions corresponding to the M survived parameter pairs into a plurality n of sub-regions; fifth circuitry configured to obtain n*M search decision metrics by adding current search stage metrics to previous search stage metrics, where n and M are integers; said second, third, fourth and fifth circuitry further configured to iterate until finished.

18. The apparatus as in claim 17, where iterating is performed until a desired parameter accuracy is obtained or a metric threshold requirement is satisfied.

19. The apparatus as in claim 17, where each parameter pair represents a center point of a disjoint sub-region in the contour surface.

20. The apparatus as in claim 17, where a search metric at each stage calculation is performed using:

$$\overline{\Lambda}(\theta_i, \varepsilon_i) = \left| \frac{1}{N\sigma_s^2} \sum_{k=\theta_i}^{\theta_i+N-1} r(k)s^*(k-\theta_i)e^{-\frac{j2\pi\varepsilon_i k}{N}} \right|^2 \text{ or}$$

$$\Lambda(h, \theta, \varepsilon) = -\sum_{k=\theta}^{\theta+N+N_h-1} |r(k)-\mu_k|^2,$$

where θ, ε, and $N_h$ are a time offset, a frequency offset and an approximate channel length, respectively, and r(k) is the received signal, where N is a number of received signals, and where each channel tap element is estimated in accordance with:

$$\hat{h}_i = \frac{1}{N\sigma_s^2} \sum_{k=\hat{\theta}+i}^{\hat{\theta}+N+i-1} r(k)s^*(k-\hat{\theta}-i)e^{-\frac{j2\pi\hat{\varepsilon}k}{N}}.$$

21. The apparatus as in claim 17, further comprising sixth circuitry configured to obtain a channel estimate by multiplying with an inverse matrix of autocorrelation matrix, $R_{SS'}$:

$$\tilde{h} = N\sigma_s^2 \cdot (R_{ss'})^+ \bar{h},$$

where $\tilde{h}$ is a true channel impulse response vector, N is a number of received signals, $\sigma_s^2$ is the signal power and where $(\cdot)^+$ represents a pseudo inverse matrix operation.

22. The apparatus of claim 17, where said circuitry is comprised of at least one of fixed and programmable circuitry.

23. The apparatus of claim 17, embodied at least partially in an integrated circuit.

* * * * *